Patented Mar. 20, 1945

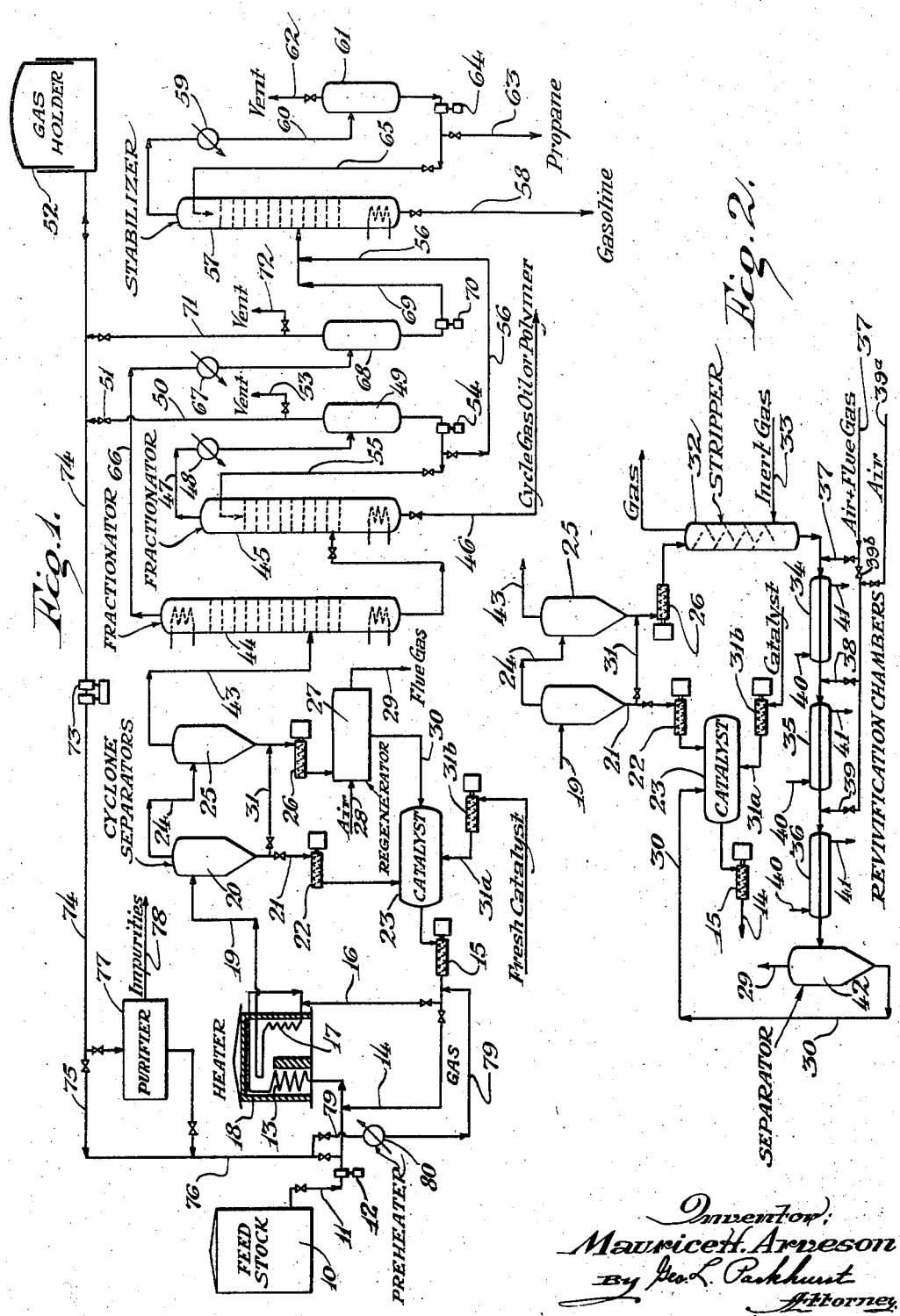

2,371,599

UNITED STATES PATENT OFFICE 2,371,599

CATALYTIC CONVERSION

Maurice H. Arveson, Flossmoor, Ill., assignor to Standard Oil Company, Chicago, Ill., a corporation of Indiana Application November 24, 1941, Serial No. 420,203

5 Claims. (Cl. 196—50)

This invention relates to processes for the catalytic conversion of hydrocarbon oils and particularly to a new method for catalytically converting such materials in the presence of hydrogen using catalysts which are suspended in the vapors undergoing conversion.

A type of catalytic conversion process which is gaining increasing attention involves the reforming, dehydrogenation and aromatization of naphthas boiling within and/or slightly above the gasoline boiling point range to produce gasolines of improved octane number. This type of process, which I will refer to hereinafter as a hydrogenation process, involves the conversion of paraffinic hydrocarbons, and in some cases olefinic and naphthenic hydrocarbons, boiling wholly or largely in the gasoline boiling point range, and particularly in the upper of the gasoline boiling point range, to gasoline range hydrocarbons having very high octane numbers. The octane number is the result of the conversion of the other type of hydrocarbons, particularly the paraffinic hydrocarbons to aromatic hydrocarbons of extremely good antiknock qualities.

While such processes have been very successfully applied to operations in which a fixed bed of catalyst is used, it has been impossible, prior to my invention, to apply the use of suspended powdered catalysts to such processes.

The failure of the prior art to accomplish this is apparently due primarily to a failure to appreciate the necessity of using low space velocities and also to a failure to provide high ratios of catalyst to oil in the reactor.

It is an object of my invention to provide a particularly advantageous reforming, aromatization or dehydrogenation process of the type in which a catalyst is suspended in the vapors undergoing conversion. Still another object of my invention is to provide a catalytic conversion process of the powdered catalyst type in which the catalyst is used with maximum efficiency. It is also an object of my invention to produce good yields of high antiknock gasoline. Other and more detailed objects, advantages and uses of my invention will become apparent as the description thereof proceeds.

In connection with my invention I can employ a powdered catalyst which is a mixture of two catalysts, one of which is primarily a cracking catalyst—for instance, alumina on silica—and the other of which is a catalyst for reactions known variously as reforming, dehydrogenation, cyclization, aromatization and dehydroaromatization reactions. For purposes of convenience I will refer to these latter types of reactions under the name of dehydrogenation reactions since all of the various processes referred to involve dehydrogenation. Thus, briefly, one of my catalysts is a cracking catalyst which is adapted to accomplish the scission of carbon to carbon bonds while the second is a dehydrogenation catalyst, the action of which is reasonably specific to the scission of carbon to hydrogen bonds.

In employing a mixed catalyst of this type, charging stocks having a substantial quantity of hydrocarbons boiling above the gasoline boiling point range as well as a substantial quantity boiling within the gasoline boiling point range can suitably be employed.

However, I prefer to employ, in place of a mixture of two catalysts, a powdered catalyst, the action of which is substantially solely directed to dehydrogenation reactions, notably of the dehydroaromatization type, and in this case the suitable charging stock is one boiling at least predominantly in the upper portion of the gasoline boiling point range, for instance within the approximate range from 200 to 450° F.

Catalysts which are particularly adapted to this reaction are the metals, or preferably the oxides of metals, from the left hand columns of groups IV, V and VI of the periodic table. Sulfides of these same metals can also be used but are definitely less desirable. Particularly good results are given by the oxides of chromium and molybdenum. While these oxides of metals from the left hand columns of groups IV, V and VI or the corresponding metals themselves can be used alone or on any desired supporting material, it is particularly efficacious to use them supported on alumina. Any form of alumina can be used but "activated alumina" gives particularly good results and alumina gel gives in general still better results. Thus a dehydrogenation catalyst can be made by digesting an alumina gel in a solution of a molybdenum salt followed by filtration, washing and drying at an elevated temperature.

The oxide or oxides, for instance alumina or molybdena adsorbed on the alumina support, can be present in various amounts but in general the active oxide or oxides (or the metal or metals) should be from 1 to 30% by weight of the total catalyst including the support, for instance 10%.

As an example of my process I refer to the accompanying drawing which illustrates one embodiment of my invention. In the drawing Figure 1 is a simplified flow diagram illustrating a process in accordance with my invention and Figure 2 is a simplified flow diagram showing one type of regeneration system which can be used in the practice of my invention.

Turning now to Figure 1, a petroleum or other hydrocarbon charging stock, for instance a heavy naphtha boiling predominantly within the range from 200 to 450° F. and preferably a virgin stock or other stock rich in paraffin hydrocarbons, is pumped from feed tank 10 through valved line 11 by means of pump 12. The powdered catalyst can be injected in a slurry form into the charge going to coil 13 by means of valved line 14 and pump 15. However, it is preferred to vaporize the charge in coil 13 before injecting the catalyst, and in this preferred operation the powdered catalyst or mixed powdered catalysts are injected into the vapor stream by means of valved line 16. If slurry catalysts are used, the liquid in which the catalyst is suspended (for instance a portion of the charge) is vaporized by the time it passes through coil 13, and thus with either slurry injection or powder injection the catalyst passes through coil 17 in powdered form suspended in the vapors to be converted.

Coil 13 can be arranged in a relatively cool portion of furnace 18 and coil 17 in the radiant section as shown.

The conversion products along with the catalyst passes through transfer line 19 to separator 20, which may suitably be of the cyclone type, where a large portion, for instance 70 to 98% of the catalyst, is separated out and recycled via line 21, pump 22 and catalyst storage and handling chamber 23. By recycling a part, preferably a large part, of the powdered catalyst the size of the regeneration system and the expense of regeneration are greatly reduced, and it is possible to increase very markedly the economically usable ratio of catalyst to oil. Thus, for instance, the catalyst to oil ratio on a weight basis, without recycling of catalyst, can be from 0.1:1 or preferably 1:1 to 2.5:1, while when catalyst is recycled the total catalyst to oil ratio can be much larger than the catalyst to oil ratio when recycling is not used and may be as high as 20:1 or even considerably higher. This total catalyst to oil ratio is, in terms of the apparatus of Figure 1, the total weight of catalysts (fresh, recycled, regenerated) charged to the contacting step in unit time divided by the weight of total charging stock charged to the contacting step in the same time, in other words it is the catalyst to oil ratio in the reaction zone.

My combination of a large proportion of catalyst recycled within the system, without regeneration, and a very high total catalyst to oil ratio in the reaction zone, for instance from 5:1 to 20:1 or higher, is particularly advantageous in the dehydrogenation or dehydro-aromatization of heavy naphthas as above described. Still higher catalyst to oil ratios up to whatever maximum can be attained with the equipment used are likewise advantageous. Thus with an upflow reactor of the type now well known to the art in which the hydrocarbon vapors pass upward through the reaction zone at a low linear velocity to suspend the powdered catalyst in a "fluid bed" of high density, the catalyst to oil ratio in the reaction zone, on a weight basis can be 50:1, 100:1 or higher.

Returning to Figure 1, the vapors from separator 20 carrying a minor part of the catalyst pass through line 24 to a second separator 25 in which substantially all of the remainder of the catalyst is separated out, steamed to remove adsorbed hydrocarbons (by means not shown) and passed by pump 26 to catalyst regeneration system 27 which can be of any desired type and in which the catalyst can be regenerated by treatment with hydrogen at high temperatures and pressures or with solvents or by any other means but preferably by blowing with air or other oxygen-containing gas, to remove carbonaceous deposits. This air can be injected through line 28 and the resulting flue gas can be withdrawn through line 29. The regenerated catalyst is conveyed through line 30 to catalyst storage and handling chamber 23.

Further adjustment of the relative amounts of catalysts recycled with and without regeneration can be accomplished by means of valved line 31. Fresh make-up catalyst can be added through line 31a by pump 31b from a source not shown.

Turning to Figure 2 I have illustrated one possible form of regeneration system in more detail. The catalyst from separator 25 passes through stripper 32 where it is stripped with an inert gas introduced through line 33, and then through a series of elongated revivification chambers 34, 35 and 36. Air diluted from flue gas enters the first revivification chamber 34 through valved line 37 along with the catalysts and additional air and flue gas can be injected by valved lines 38 and 39 into the subsequent revivification chambers 35 and 36, or air alone can be introduced into the latter chambers by the use of valved line 39a, valve 39b being closed, in order to accomplish complete oxidation of the carbonaceous material without overheating the catalyst in the first revivification chamber 34. Chambers 34, 35 and 36 can be cooled by a cooling medium introduced through line 40 and removed through lines 41 to prevent overheating the catalysts during revivification. The revivified or regenerated catalyst along with the gases pass to separator 42 which may be of the cyclone type and the gases are discarded through flue 29. The catalyst is then conveyed through line 30 to catalyst storage and handling chamber 23.

It may be well to mention at this point that the diagrammatic showing of Figures 1 and 2 omits many features which those skilled in the art would recognize as desirable or essential in actual plant operation. These omissions are made in order to simplify the presentation of the invention and to avoid encumbering it with well understood engineering details. Thus, for example, catalyst conveying and handling systems are not shown in detail, gas locks between the conversion system and the regeneration system are not provided and various desirable flow control, pumping, heat exchange and safety equipment is omitted from the diagrammatic representation.

Reverting now to Figure 1 conversion products pass from separator 25 through line 43 to fractionator 44. In this fractionator, which is preferably operated under rather high pressure, a rough separation between gasoline and gas is made. The liquid from this fractionating column is passed to a second fractionator 45 where material boiling above the gasoline boiling point range is separated as a bottoms and withdrawn through valved line 46. This material which may be called cycle gas oil or polymer can be recycled with the feed or, preferably, withdrawn from the system for thermal conversion or other use. The gasoline product is taken overhead from fractionator 45 through line 47 and condenser 48 to separator 49 from which gas passes through line 50 and valve 51 to gas holder 52 or is recycled to the conversion step. Alternatively all or part of this gas can be removed from the system through valved vent line 53.

The gasoline in separator 49 is divided into two streams, part being recycled to fractionator 45 by means of pump 54 and valved line 55 as reflux and the remainder being pumped by pump 54 through valved line 56 to stabilizer 57, from the bottom of which the high octane number gasoline product is withdrawn through valved line 58. The light hydrocarbon gases from stabilizer 57 pass through condenser 59 and line 60 to separator 61 from which fixed gases are removed from the system through valved line 62, while the condensables are in part removed through valved line 63 and in part recycled as reflux to stabilizer 57 by means of pump 64 and valved line 65.

I have described how the liquid fraction from fractionator 44 is carried through to the finished gasoline. However, since this first fractionator makes only a rough separation between gas and gasoline, the overhead which is removed through line 66 and condenser 67 contains considerable gasoline as well as other condensables, and these are separated from gas in separator 68 and sent to stabilizer 57 through line 69 by pump 70. The gases from this separator which are very rich in hydrogen pass through valved line 71 for recycling. Gas holder 52 floats on the recycle line. However, since my process produces hydrogen rather than consuming it, a portion of this gas must be removed from the system through valved line 72 when the capacity of the gas holder is exceeded.

Hydrogen is added to the feed by means of compressor 73 in line 74. This hydrogen (being that produced by the process) inevitably contains considerable amounts of methane and other light hydrocarbons as well as other impurities. While this impure hydrogen can be sent directly into the conversion coil 13 via line 74, valved by-pass line 75 and line 76, it can alternatively be sent, in whole or in part, through a purification system 77 (shown diagrammatically) from which impurities are removed via line 78. This purification system may involve absorption, gas-cracking, and/or other steps, but does not constitute an important feature of the present invention and will therefore not be described in detail.

Movement of catalyst in lines 14 and/or 16 can be aided by introduction of gas from line 76 through valved line 79 to the discharge line from pump 15. This gas may be, and preferably is, preheated by preheater 80 which may be a coil in furnace 18 or in a separate furnace. If desired all hydrogen-containing gas may be introduced by this route.

By thus converting the charging stock in the presence of added hydrogen, much larger yields of the valuable aromatic hydrocarbons can be obtained and the catalyst does not deteriorate as readily or require regeneration as often as it otherwise would. However, in my powdered catalyst system the added hydrogen has another very important advantage; namely, it increases the vapor volume and vapor velocity to a point which permits much higher ratios of catalyst to charge than would otherwise be possible, and thus gives greatly improved catalyst efficiency.

The temperature in coil 17 where the bulk of the conversion takes place can suitably be between 850 and 1025° F., for instance 950° F. The charge can be preheated in coil 13 to about reaction temperature.

My process can be operated at atmospheric pressure or at a slightly elevated pressure, for instance from 30 to 450 pounds per square inch. Pressures of 100 to 200 pounds per square inch are suitable.

As previously pointed out, I find it highly desirable to use an extremely large amount of catalyst, particularly when the catalyst is rich in, or confined to, the dehydrogenation component. Thus, for instance, excellent results are obtained by suspending in the hydrocarbon vapors mixed with hydrogen an amount of powdered catalyst equal to from about 5 to about 20 times the weight of charging stock present in the mixed vapors in which the catalyst is suspended. Any desired higher ratio can be used, the important feature in this connection being a high ratio, at least about 5 to 1. Having chosen a ratio of catalyst to oil, I then find it highly desirable to use a contacting zone of such size as to give a space velocity of from 0.1 to 3 volumes of charging stock (measured as liquid) passing through the contacting zone per hour per apparent or net volume of catalyst present in this contacting zone. By apparent or net volume of the catalyst I refer to the gross space which would be occupied by the catalyst if the catalyst particles were at rest in contact with each other as they are in a fixed bed. This preferred space velocity of from 0.1 to 3 volumes per volume per hour is applicable not only to my preferred powdered catalyst technique but also to fixed bed and moving granular bed work. As an example a space velocity of 1.4 is suitable.

Recycle gas rich in hydrogen can be used in amounts ranging from 0.5 to 10 mols per mol of charge. This mol ratio is roughly the same as the ratio by volume of recycled gas to vaporized charge, both being measured at the same temperature. The mol ratio or vapor ratio may, for instance, be 2.

This is a continuation-in-part of my copending application Ser. No. 294,772, filed September 13, 1939.

Having described my invention in connection with certain specific embodiments thereof, I wish it to be understood that these are by way of example rather than by way of limitation and that I do not intend to be restricted thereby but only to the scope of the appended claims.

I claim:

1. A process for the conversion of heavy naphtha into high octane gasoline which comprises maintaining within a conversion zone an admixture of hydrogen, naphtha vapors and a powdered hydroaromatization catalyst, the said catalyst being dispersed in said admixture, passing the admixture through said conversion zone at a space velocity of between about 0.1 and about 3 volumes of naphtha measured as a liquid per hour per net volume of catalyst within said conversion zone, the weight of naphtha in the conversion zone in which the catalyst is dispersed being not more than about one-fifth the weight of the dispersed catalyst within the conversion zone, and maintaining the conversion zone at reaction temperature and pressure.

2. A process for the conversion of a hydrocarbon charging stock comprising substantial proportions of hydrocarbons boiling within the gasoline boiling point range to antiknock gasoline which comprises the steps of contacting an admixture of charging stock vapors, added hydrogen and a large amount of powdered dehydrogenation catalyst within a conversion zone at an elevated temperature, the weight of charging stock in the conversion zone in which the catalyst is dispersed being not more than about one-fifth the weight of the dispersed catalyst in said zone maintaining a net flow of the charging stock through said conversion zone at a space velocity of between about 0.1 and about 3 volumes of charging stock measured as a liquid per hour per net volume of catalyst within said conversion zone, continuously separating out between about 70% and about 98% of said catalyst, contacting additional quantities of said charging stock with said separated catalyst within the said conversion zone without intermediate regeneration of said catalyst, separating from the conversion products the remainder of said catalyst, regenerating the last mentioned catalyst in a hot process, and contacting additional amounts of charging stock with the regenerated catalyst.

3. The process for converting hydrocarbon charging stock comprising substantial proportions of hydrocarbons boiling within the gasoline boiling point range into high octane number gasoline which comprises the steps of contacting an admixture of hydrocarbon vapors and heated hydrogen with powdered dehydrogenation catalyst to suspend the catalyst therein, contacting said admixture with said suspended catalyst at a temperature of between about 850° F. and about 1025° F. within a contacting zone, passing the charging stock vapors through said contacting zone at a space velocity of between about 0.1 and about 3 volumes of said charging stock measured as a liquid per hour per net volume of said catalyst within said contacting zone, the weight of hydrocarbon charging stock in the conversion zone in which the catalyst is contacted being not more than about one-fifth of the weight of catalyst within the conversion zone.

4. A process for the conversion of a heavy naphtha to high octane number gasoline which comprises contacting an admixture of naphtha vapors, between about 0.5 and about 10 mols of hydrogen-rich gas per mol of naphtha and a powdered dehydrogenation catalyst, passing said naphtha through a conversion zone at a space velocity of between about 0.1 and about 3 volumes of liquid naphtha per hour per net volume of catalyst in said conversion zone, maintaining within the conversion zone a concentration of gases and vapors equal to not more than one-fifth the weight of the dispersed catalyst within the conversion zone, maintaining the conversion zone at a temperature of between about 850 and about 1025° F. and at a pressure of between about 30 and about 450 pounds per square inch, continuously separating the bulk of the suspended catalyst from the conversion products, contacting additional amounts of naphtha with the said catalyst within the conversion zone without regeneration of the catalyst, recovering the remainder of said catalyst from the conversion products, and regenerating the last mentioned catalyst in a hot process and recycling the regenerated catalyst to the conversion zone.

5. A process for the conversion of a hydrocarbon charging stock comprising substantial proportions of hydrocarbons boiling within the gasoline boiling point range into a high octane number gasoline which process comprises the steps of contacting an admixture of hydrocarbon charging stock vapors, between about 0.5 and about 10 mols of added hydrogen-rich gas per mol of said charging stock, and a powdered dehydrogenation catalyst, maintaining said mixed vapors and suspended catalyst within a conversion zone at a temperature of between about 850 and about 1025° F. and at a pressure of between about 30 and about 450 pounds per square inch, passing said hydrocarbon vapors through said conversion zone at a space velocity of between about 0.1 and about 3 volumes of said charging stock measured as a liquid per hour per net volume of catalyst present in said conversion zone, and maintaining a dispersion of catalyst in mixed vapors within the conversion zone, the weight of charging stock in the conversion zone in which the catalyst is dispersed being not more than about one-fifth the weight of the dispersed catalyst.

MAURICE H. ARVESON.